United States Patent [19]

Matsuzaki et al.

[11] 4,436,900

[45] Mar. 13, 1984

[54] PROCESS FOR DEACTIVATING POLYMERIZATION CATALYST

[75] Inventors: Kazuhiko Matsuzaki; Toshiyuki Iwaisako; Junzo Masamoto, all of Kurashiki, Japan

[73] Assignee: Asahi Kasei Kogyo Kabushiki Kaisha, Osaka, Japan

[21] Appl. No.: 479,385

[22] Filed: Mar. 28, 1983

[30] Foreign Application Priority Data

Mar. 29, 1982 [JP] Japan ................................. 57-48990

[51] Int. Cl.³ ................................................ C08G 2/28
[52] U.S. Cl. ................................. 528/490; 528/241; 528/243; 528/492; 528/499
[58] Field of Search ............... 528/241, 243, 490, 492, 528/499

[56] References Cited

U.S. PATENT DOCUMENTS

| | | | |
|---|---|---|---|
| 2,989,509 | 6/1961 | Hudgin et al. | 528/492 |
| 3,419,529 | 12/1968 | Chase et al. | 528/499 X |
| 4,087,411 | 5/1978 | Sugio et al. | 528/241 X |
| 4,225,703 | 9/1980 | Amann et al. | 528/492 X |
| 4,339,569 | 7/1982 | Sugio et al. | 528/241 X |

FOREIGN PATENT DOCUMENTS 47-46794 11/1972 Japan .
47-46795 11/1972 Japan .
55-42085 10/1980 Japan .

*Primary Examiner*—Lucille M. Phynes
*Attorney, Agent, or Firm*—Sprung, Horn, Kramer & Woods

[57] ABSTRACT

An oxymethylene copolymer produced from trioxane, a cyclic ether and/or a cyclic formal in the presence of a cationic polymerization catalyst is contacted with a deactivating agent for the catalyst in the state of gas phase at a temperature of 160° C. or lower to deactivate the cationic polymerization catalyst rapidly and completely without causing degradation of the copolymer produced.

13 Claims, No Drawings

PROCESS FOR DEACTIVATING POLYMERIZATION CATALYST

BACKGROUND OF THE INVENTION

This invention relates to a process for deactivating a polymerization catalyst, more in detail, to a process for deactivating a cationic polymerization catalyst for the production of oxymethylene copolymers.

It is well known that oxymethylene copolymers can be obtained by copolymerization of trioxane and a cyclic ether and/or a cyclic formal using a cationic polymerization catalyst. Since the thus obtained copolymers are insufficient in thermal stability, terminal stabilization is conducted to reduce and to remove unstable portions of terminal portions of the copolymers. Prior to the terminal stabilization of the obtained copolymers, it is necessary to deactivate the cationic polymerization catalyst used. That is, if the cationic polymerization catalyst retained in the copolymer obtained is not deactivated, the copolymer would be depolymerized gradually to give a remarkable lowering in the molecular weight.

There have been proposed various processes for deactivating catalysts used in the copolymerization. For example, according to U.S. Pat. No. 2,989,509, neutralization of catalyst is conducted in a solvent using an aliphatic amine. But this process is disadvantageous in that the neutralization rate of the catalyst is relatively slow, the polymer obtained is easily decomposed, and complicated steps are necessary for separating the polymer and the solvent by, for example, filtration, and the like. Japanese Patent Appln. Kokoku (Post-Exam. Publn.) No. 42085/80 discloses a process for terminating the polymerization reaction by using a solid trivalent organic phosphorus compound as deactivating agent. According to this process, deactivation rate of catalyst is slow and the polymer obtained is depolymerized very often during the deactivation operation. Thus, in order to avoid such a case, the temperature at the time of deactivation operation should be lowered as low as possible. Further, it is necessary to use an apparatus for strongly kneading the solid organic phosphorus compound and the polymer. On the other hand, Japanese Patent Appln. Kokoku (Post-Exam. Publn.) Nos. 46794/72 and 46795/72 disclose a process for subjecting the polymer obtained to ammonolysis using vapors of an organic solvent or water and ammonia. This process is a process for terminal stabilization either by conducting immediately terminal stabilization without conducting deactivation of the catalyst or by conducting terminal stabilization after deactivation of the catalyst in a solvent. According to this process, there are brought about undesirably degradation of the polymer obtained and generation of formaldehyde by the terminal stabilization reaction. This process has disadvantages in that the formaldehyde generated is mixed with the organic solvent, water, and ammonia in large amounts to make separation of individual components very difficult, more troublesomely the formaldehyde generated reacts with ammonia to form a solid product (hexamethylenetetramine) which contaminates the copolymer obtained, and recovery of ammonia and formaldehyde becomes impossible. Therefore, when ammonia is used, the generation of formaldehyde should be avoided.

SUMMARY OF THE INVENTION

It is an object of this invention to provide a process for deactivating a cationic polymerization catalyst for producing copolymers of trioxane rapidly and completely overcoming disadvantages of prior art processes.

This invention provides a process for deactivating a cationic polymerization catalyst for the production of an oxymethylene copolymer from trioxane and a cyclic ether and/or a cyclic formal in the presence of the cationic polymerization catalyst which comprises contacting a deactivating agent in the state of gas phase with the copolymer produced at a temperature not causing degradation of the copolymer produced.

DETAILED DESCRIPTION OF PREFERRED EMBODIMENTS

According to this invention, since the solid copolymer produced is contacted with a deactivating agent for catalyst in the state of gas phase in a certain temperature range not causing degradation (or depolymerization) of the copolymer produced, deactivation of the catalyst in the copolymer can be proceeded smoothly. In such a case, the deactivating agent can be used alone or can be used in diluted state together with a carrier such as an inert gas, e.g., nitrogen, or water vapor, a vapor of organic solvent, etc.

As the cyclic ether which is to be copolymerized with trioxane, there can be used conventional ones such as ethylene oxide, propylene oxide, butylene oxide, oxetane, styrene oxide, cyclohexene oxide, etc.

As the cyclic formal, there can be used conventional ones such as ethylene glycol fromal, 1,4-butanediol formal, 1,5-pentanediol formal, diethylene glycol formal, triethylene glycol formal, etc.

In this invention, a cationic polymerization catalyst is used as catalyst for copolymerization. The first group of the cationic polymerization catalyst includes Friedel-Crafts type compounds, e.g., stannic tetrachloride, stannic tetrabromide, titanium tetrachloride, aluminum trichloride, zinc chloride, vanadium trichloride, antimony pentafluoride, boron trifluoride, coordination compounds of boron trifluoride such as boron trifluoride diethyletherate, boton trifluoride dibutyletherate, boron trifluoride hydrate, boron trifluoride methanolate, boron trifluoride triethylamine complex, etc.

The second group of the cationic polymerization catalyst includes inorganic and organic acids such as perchloric acid, acetyl perchlorate, hydroxyacetic acid, trichloroacetic acid, p-toluenesulfonic acid, etc.

The third group of the cationic polymerization catalyst includes complex salt compounds such as triethyloxonium tetrafluoroborate, triphenylmethyl hexafluoroantimonate, aryldiazonium hexafluorophosphate, aryldiazonium tetrafluoroborate, etc.

The forth group of the cationic polymerization catalyst includes alkyl metals such as zinc diethyl, triethylaluminum, diethylaluminum chloride, etc.

Among these compounds, boron trifluoride and boron trifluoride coordination compounds are particularly preferred as cationic polymerization catalyst from the viewpoint of copolymerization activity.

The deactivating agent for catalyst is always used in this invention in the state of gas phase. Thus, the deactivating agent is required to have a vapor pressure. Compounds having a vapor pressure of 1 mm Hg or more at 100° C. are preferable as deactivating agent. Further, the deactivating agent is required to have a basicity, since a cationic polymerization catalyst is deactivated by using such a deactivating agent.

The deactivating agent usable in this invention can be divided into five groups.

The first group includes ammonia.

The second group includes primary amines represented by the formula: $R_1NH_2$, wherein $R_1$ is an alkyl group preferably having 1 to 20 carbon atoms, a substituted alkyl group having 1 to 20 carbon atoms substituted with one or more halogen atoms, hydroxyl groups or alkoxy groups, a phenyl group, or a substituted phenyl group, e.g., a phenyl group substituted with one or more alkyl groups, halogen atoms, hydroxyl groups or alkoxy groups. Examples of the primary amines are methylamine, ethylamine, butylamine, octylamine, laurylamine, stearylamine, chloromethylamine, methoxybutylamine, phenylamine, aniline, p-methylaniline, p-octylaniline, etc.

The third group includes secondary amines represented by the formula: $R_1R_2NH$, wherein $R_1$ and $R_2$ are independently an alkyl group, a substituted alkyl group, a phenyl group, or a substituted phenyl group, the carbon number of alkyl group and the substituents being the same as defined above. Examples of the secondary amines are dimethylamine, diethylamine, isopropylmethylamine, dibutylamine, dioctylamine, methylbutylamine, methyllaurylamine, methylstearylamine, methylphenylamine, diphenylamine, N-methylaniline, etc.

The forth group includes tertiary amines represented by the formula: $R_1R_2R_3N$, wherein $R_1$, $R_2$ and $R_3$ are independently an alkyl group, a substituted alkyl group, a phenyl group, or a substituted phenyl group, the carbon number of alkyl group and the substituents being the same as defined above. Examples of the tertiary amines are trimethylamine, triethylamine, tripropylamine, tributylamine, dimethylbutylamine, diethyllaurylamine, methyldistearylamine, dimethylphenylamine, N,N-dimethylaniline, N,N-3,5-tetramethylaniline, etc.

The fifth group includes heterocyclic amines. Examples of heterocyclic amines are ethyleneimine, pyrrole, pyrrolidine, pyridine, piperidine, morpholine, etc.

It is also possible to use as deactivating agent basic compounds other than those mentioned above having a vapor pressure.

Among these deactivating agents, ammonia and amine compounds are preferable from the viewpoint of deactivation rate, and triethylamine, tripropylamine and tributylamine are more preferred. It is possible to use the deactivating agent alone or to use the deactivating agents in combination of two or more of them.

It is possible to use the deactivating agent alone without using a carrier or to use the deactivating agent together with a carrier by diluting the deactivating agent with the carrier. The use of a carrier is preferable when there is used a compound having a lower vapor pressure as deactivating agent.

As the carrier, there can be used inert gases such as nitrogen, water vapor, and an organic solvent vapor. As the organic solvent, there can be used aliphatic hydrocarbons such as pentane, hexane, cyclohexane, etc., aromatic hydrocarbons such as benzene, toluene, xylene, etc., halogenated hydrocarbons such as methylene chloride, chloroform, dichloroethane, etc., alcohols such as methanol, ethanol, butanol, etc., ketones such as acetone, methyl ethyl ketone, etc., esters such as methyl formate, ethyl acetate, etc.

It is preferable to use the deactivating agent in an amount of equimole or more per mole of the cationic polymerization catalyst used, more preferably 1.5 moles or more per mole of the cationic polymerization catalyst used. There is no particular upper limit to the amount of the deactivating agent, but a suitable upper limit will be determined from the viewpoint of recovering of unreacted deactivating agent.

It is necessary to contact the deactivating agent with the copolymer produced at a temperature (deactivation temperature) of not causing degradation of the copolymer produced, more concretely at a temperature of from 0° C. to 160° C. To control the temperature in the above-mentioned range is important at the time of contacting the deactivating agent with the copolymer produced. The upper limit of the deactivation temperature is determined from the viewpoints of not causing degradation (depolymerization) of the copolymer produced and not causing melting of the copolymer produced. On the other hand, the lower limit of the deactivation temperature is determined from the viewpoints of not lowering the reaction rate of the reaction of the polymerization catalyst and the deactivating agent and maintaining of the deactivating agent as the gas phase.

When ammonia is used as deactivating agent, a deactivation temperature as low as possible, more preferably from 0° C. to 80° C., is employed considering that ammonia can easily degrade (depolymerise) the copolymer produced and ammonia easily reacts with formaldehyde which is produced by degradation to give a solid product (hexamethylenetetramine).

In the case of using deactivating agents other than ammonia, a temperature range of from 20° C. to 140° C. is preferable.

Deactivation of the catalyst can be attained by adding or pouring the vapor of deactivating agent to or into the system wherein copolymerization of trioxane and a cyclic ether and/or a cyclic formal takes place. Or the deactivation of the catalyst can be completed by transferring the oxymethylene copolymer produced to the vapor of deactivating agent.

Features of this invention can be summarized as follows:

(1) Since the oxymethylene copolymer produced is contacted with the deactivating agent in gas phase state, the deactivation rate of catalyst is fast and the deactivation of catalyst is proceeded completely at the same time.

(2) Separation of the oxymethylene copolymer, the deactivating agent and the carrier after the completion of deactivation of catalyst is easy.

(3) There takes place no degradation (or depolymerization) of oxymethylene copolymer produced nor generation of formaldehyde at the time of deactivation of catalyst.

This invention is illustrated by way of the following Examples and Comparative Examples, in which all parts and percents are by weight unless otherwise specified.

In the following Examples, a reduced viscosity is used as a measure for molecular weight and measured in a p-chlorophenol-tetrachloroethane (1:1 weight ratio) solution with a copolymer concentration of 0.5 g/dl at 60° C.

$K_{222}$ is a thermal decomposition rate constant of a copolymer at 222° C. in vacuum and is a measure for thermal stability of the copolymer.

When a cation polymerization catalyst is not deactivated and retained in an oxymethylene copolymer produced, lowering in the reduced viscosity and $K_{222}$ is observed.

Example 1

In a kneader having two sigma type stirring blades, 500 parts of sufficiently dehydrated trioxane, 8 parts of ethylene oxide and 0.42 part of methylal were placed and heated to 75° C. Then, 0.15 part of boron trifluoride dibutyletherate was added to the kneader and copolymerization was initiated. After 40 minutes, nitrogen containing 5.3% of triethylamine was introduced into the kneader through a pipe heated at 120° C. for 20 minutes. The contact temperature of the triethylamine and the copolymer produced was 77° C. The amount of triethylamine introduced into the kneader in the gas phase state during that time was 8 parts. By condensing a vent gas obtained during the deactivation, there was detected 32 parts of unreacted trioxane. No formaldehyde was detected in the resulting condensate.

The contents were taken out of the kneader and dried in vacuum at 80° C. for 12 hours to recover 465 parts of copolymer. Further, by condensing a whole amount of vent gases obtained by drying in vacuum, there was detected 11 parts of unreacted trioxane.

The copolymer had a reduced viscosity of 1.93 and $K_{222}$ of 0.03 %/min. It was clear that the deactivation of the cationic polymerization catalyst was completed rapidly and completely.

Examples 2 to 10

The process of Example 1 was repeated except for using a deactivating agent listed in Table 1 in place of triethylamine.

The results are as shown in Table 1. In individual Examples, the cationic polymerization catalyst was completely deactivated rapidly.

TABLE 1

| Example No. | Deactivating agent for catalyst Name | Concentration (%) | Adding amount (parts) | Copolymer produced (parts) | Reduced viscosity | $K_{222}$ (%/min) |
| --- | --- | --- | --- | --- | --- | --- |
| 2 | Tributylamine | 1.3 | 7 | 466 | 1.93 | 0.04 |
| 3 | Diethylamine | 8.2 | 8 | 463 | 1.93 | 0.05 |
| 4 | Aniline | 0.8 | 6 | 455 | 1.90 | 0.04 |
| 5 | Ammonia | 28.8 | 8 | 465 | 1.92 | 0.04 |
| 6 | Pyridine | 8.5 | 8 | 453 | 1.90 | 0.06 |
| 7 | Trimethylamine | 15.3 | 8 | 464 | 1.92 | 0.04 |
| 8 | Octylamine | 4.2 | 8 | 460 | 1.90 | 0.05 |
| 9 | Isopropylmethylamine | 3.9 | 7 | 462 | 1.90 | 0.04 |
| 10 | Tripropylamine | 2.5 | 5 | 465 | 1.93 | 0.03 |

Examples 11 to 16

The process of Example 1 was repeated except for using a cationic polymerization catalyst listed in Table 2 in place of boron trifluoride dibutyletherate.

The results are as shown in Table 2. In individual Examples, the cationic polymerization catalysts were completely deactivated rapidly.

TABLE 2

| Example No. | Cationic polymerization catalyst Name | Parts | Copolymer obtained (parts) | Reduced viscosity | $K_{222}$ (%/min) |
| --- | --- | --- | --- | --- | --- |
| 11 | Boron trifluoride | 0.08 | 465 | 1.93 | 0.03 |
| 12 | Triethyloxonium tetrafluoroborate | 0.30 | 459 | 1.92 | 0.04 |
| 13 | Stannic tetrachloride | 0.28 | 442 | 1.90 | 0.05 |
| 14 | Acetyl perchlorate | 0.25 | 440 | 1.89 | 0.05 |
| 15 | Aryldiazonium hexafluorophosphate | 0.29 | 438 | 1.92 | 0.05 |
| 16 | Boron trifluoride diethyletherate | 0.10 | 466 | 1.93 | 0.03 |

Example 17

Into a jacketed cylindrical drier having an inner diameter of 30 cm and a length of 210 cm, nitrogen containing 4.6% of triethylamine was introduced from an understream side at a flow rate of 10 liter/min. At the same time, an oxymethylene copolymer obtained by copolymerizing trioxane and ethylene glycol formal (containing oxyethylene unit 2.1%) was supplied to the drier from an inlet for the drier at a rate of 114 g/min. The copolymer contained boron trifluoride dibutyletherate in an amount of 0.032%. The drier was heated by passing steam having a pressure of 0.8 kg/cm$^2$G through the jacket. The copolymer was taken out of the drier at a rate of 110 g/min from an outlet of the drier. From a vent of the drier, unreacted trioxane was detected at a rate of 4 g/min.

The resulting copolymer had a reduced viscosity of desirable value of 2.08 and no decomposition was detected in the drier. The value of $K_{222}$ was 0.03 %/min. It was clear that the deactivation of the cationic polymerization catalyst was completed rapidly and completely.

Comparative Example 1 (An example of deactivation in liquid phase)

In a kneader having two sigma type stirring blades, 500 parts of sufficiently dehydrated trioxane, 8 parts of ethylene oxide, and 0.42 part of methylal were placed and heated to 75° C. Then, 0.15 parts of boron trifluoride dibutyletherate was added to the kneader and copolymerization was initiated. After 40 minutes, toluene containing 1.2% of tributylamine was poured into the kneader at a rate of 30 parts/min in the liquid state for 20 minutes. The amount of tributylamine poured into the kneader in the liquid state during such a period was 7 parts.

The contents were taken out of the kneader and dried in vacuum at 80° C. for 12 hours to recover 460 parts of copolymer. By condensing a whole amount of vent gases from the vacuum drier, there were detected 43 parts of unreacted trioxane and 5 parts of formaldehyde.

The copolymer had a reduced viscosity of 1.83 and $K_{222}$ of 0.08 %/min, which values were inferior to those of Example 2. This seems to be derived from the fact that the deactivation rate of cationic polymerization catalyst in the liquid phase is slower than in the gas phase.

Further, it should be noted that a large amount of formaldehyde is detected among the vent gases during the drying in vacuum. This is caused by depolymerization of the copolymer during the drying due to insufficient deactivation of the cationic polymerization catalyst.

Comparative Example 2 (An example of too high deactivation temperature)

In a jacketed kneader having two sigma type stirring blades, 500 parts of sufficiently dehydrated trioxane, 8 parts of ethylene oxide, and 0.42 part of methylal were placed and heated to 75° C. Then, 0.15 part of boron trifluoride dibutyletherate was added to the kneader and copolymerization was initiated. After 40 minutes, the contents were heated to 163° C. by passing steam through the jacket of the kneader. At the same time, nitrogen containing 5.5% of triethylamine was introduced into the kneader through a pipe heated at 163° C. for 20 minutes. The contact temperature of the triethylamine and the copolymer produced was 163° C. The amount of triethylamine introduced into the kneader during such a period was 8.3 parts. By condensing whole vent gases generated during the deactivation, there were detected 42 parts of unreacted trioxane and 31 parts of formaldehyde. The copolymer was decomposed in the kneader vigorously.

The contents were taken out of the kneader and dried in vacuum at 80° C. for 12 hours to recover 433 parts of copolymer. Further, by condensing a whole amount of vent gases obtained by drying in vacuum, there were detected 1 part of unreacted trioxane and 1 part of formaldehyde.

The copolymer had a reduced viscosity of 1.35 and $K_{222}$ of 0.13 %/min, which values were inferior to those of Example 1. This seems to be caused by too high deactivation temperature, which decomposed the copolymer produced during the deactivation.

Comparative Example 3 (An example of too low deactivation temperature)

In a jacketed kneader equipped with two sigma type stirring blades, 500 parts of sufficiently dehydrated trioxane, 8 parts of ethylene oxide, and 0.42 part of methylal were placed and heated to 75° C. Then, 0.15 part of boron trifluoride dibutyletherate was added to the kneader and copolymerization was initiated. After 40 minutes, the contents were cooled to −5° C. by passing a refrigerant through the jacket of the kneader. At the same time, nitrogen containing 10.8% of methylamine was introduced into the kneader through a pipe cooled at −5° C. for 20 minutes. The contact temperature of the methylamine and the copolymer produced was −5° C. The amount of methylamine introduced into the kneader during such a period was 10.7 parts. By condensing vent gases generated during the deactivation, there was obtained 3 parts of unreacted trioxane.

Then, the contents were taken out of the kneader and dried in vacuum at 80° C. for 12 hours to recover 442 parts of copolymer. By the analysis of vent gases generated during the drying in vacuum, 50 parts of unreacted trioxane and 13 parts of formaldehyde were detected. Since the deactivation of the cationic polymerization catalyst was slow and incomplete, the copolymer was suffered decomposition at the time of drying in vacuum.

The copolymer had a reduced viscosity of 1.46 and $K_{222}$ of 0.12 %/min, which values were inferior to those of Example 1. This fact is caused by too low deactivation temperature, which did not proceed the reaction between the cationic polymerization catalyst and the deactivating agent smoothly.

Comparative Example 4 (An example of the high deactivation temperature)

In a jacketed kneader equipped with two sigma type stirring blades, 500 parts of sufficiently dehydrated trioxane, 8 parts of ethylene oxide and 0.42 parts of methylal were placed and heated to 75° C. Then, 0.15 part of boron trifluoride dibutyletherate was added to the kneader and copolymerization was initiated. After 40 minutes, the contents were heated to 105° C. by passing steam through the jacket of the kneader. At the same time, steam containing 10.8% of ammonia was introduced into the kneader through a pipe heated at 105° C. for 20 minutes. The contact temperature of the ammonia and the copolymer produced was 105° C. The amount of ammonia introduced into the kneader during such a period was 18.2 parts. By condensing vent gases generated during the deactivation, there were detected 30 parts of unreacted trioxane, 13 parts of formaldehyde, and 18 parts of hexamethylenetetramine (a reaction product of formaldehyde and ammonia). Further, the copolymer in the kneader contained a considerable amount of hexamethylenetetramine.

Then, the contents were taken out of the kneader, washed with acetone three times, and dried in vacuum at 80° C. for 12 hours to recover 426 parts of copolymer. The recovery amount of the copolymer was not good compared with that of Example 1. This is caused by the decomposition of the copolymer at too high contact temperature between the copolymer produced and the ammonia. Further, in this example, since the copolymer was contaminated with the reaction product of formaldehyde and ammonia, washing of the copolymer was necessary.

The copolymer had a reduced viscosity of 1.33, which means a remarkable decrease in molecular weight. $K_{222}$ was 0.07 %/min.

What is claimed is:

1. A process for deactivating a cationic polymerization catalyst for the production of an oxymethylene copolymer from trioxane and a cyclic ether and/or a cyclic formal in the presence of the cationic polymerization catalyst which comprises contacting a deactivating agent in the state of gas phase with the copolymer produced at a temperature not causing degradation of the copolymer produced.

2. A process according to claim 1, wherein the cationic polymerization catalyst is boron trifluoride or a boron trifluoride coordination compound.

3. A process according to claim 1, wherein the deactivating agent is a compound having a vapor pressure of 1 mm Hg at 100° C.

4. A process according to claim 1, wherein the deactivating agent is ammonia.

5. A process according to claim 1, wherein the deactivating agent is an amine selected from compounds represented by the formulas: $R_1NH_2$, $R_1R_2NH$ and $R_1R_2R_3N$, wherein $R_1$, $R_2$ and $R_3$ are independently an alkyl group, a substituted alkyl group, a phenyl group or a substituted phenyl group.

6. A process according to claim 5, wherein the amine is triethylamine, tripropylamine or tributylamine.

7. A process according to claim 1, wherein the deactivating agent is contacted with the copolymer produced without using a carrier.

8. A process according to claim 1, wherein the deactivating agent is contacted with the copolymer produced using nitrogen as carrier.

9. A process according to claim 1, wherein the deactivating agent is contacted with the copolymer produced using water vapor as carrier.

10. A process according to claim 1, wherein the deactivating agent is contacted with the copolymer produced using an organic solvent in the state of gas phase as carrier.

11. A process according to claim 1, wherein ammonia as deactivating agent is contacted with the copolymer produced at a temperature of from 0° C. to 80° C.

12. A process according to claim 1, wherein a primary, secondary or tertiary amine or a heterocyclic amine as deactivating agent is contacted with the copolymer produced at a temperature of from 20° C. to 140° C.

13. A process according to claim 1, wherein the amount of deactivating agent is 1 mole or more per mole of the cationic polymerization catalyst used.

* * * * *